H. H. BOYCE.
TEMPERATURE INDICATING DEVICE FOR INTERNAL COMBUSTION ENGINES.
APPLICATION FILED MAY 13, 1916.
1,373,860.
Patented Apr. 5, 1921.
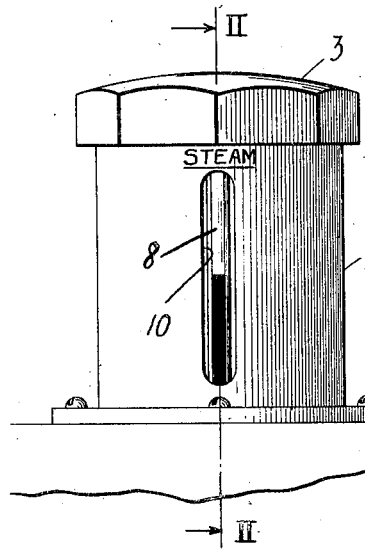
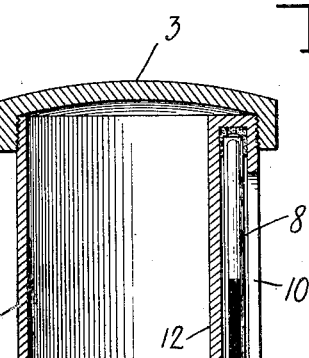
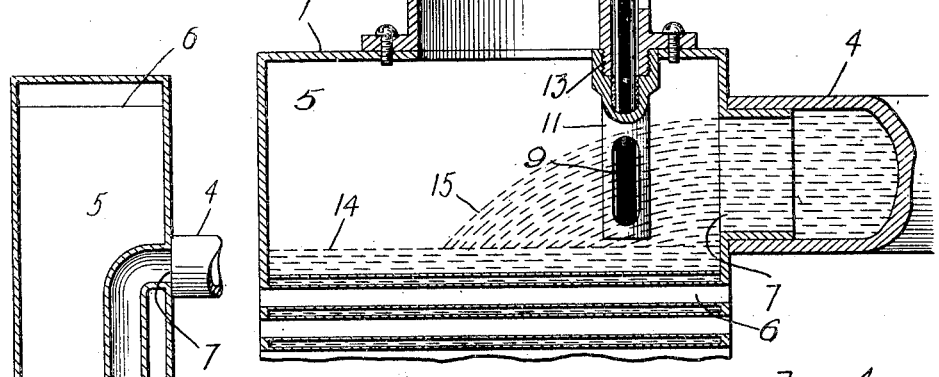
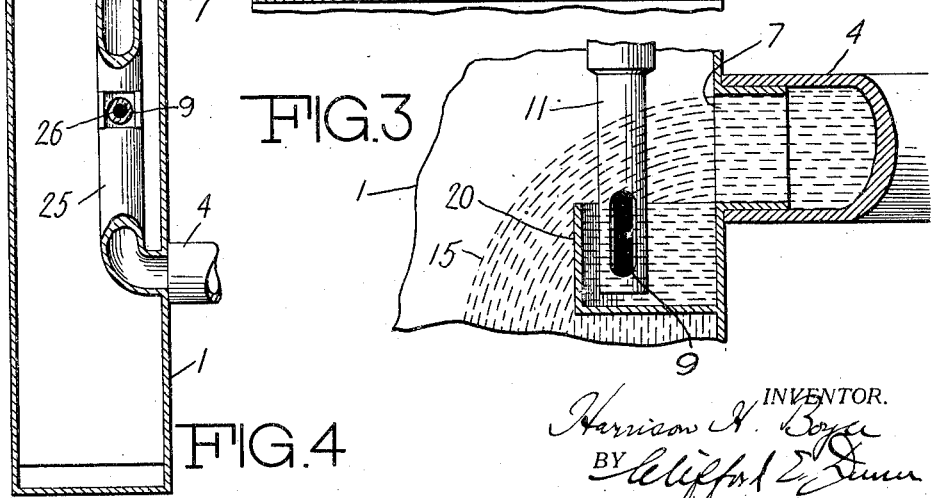
INVENTOR.
Harrison H. Boyce
BY Clifford E. Dunn
ATTORNEY

UNITED STATES PATENT OFFICE.

HARRISON H. BOYCE, OF FOREST HILLS, NEW YORK.

TEMPERATURE-INDICATING DEVICE FOR INTERNAL-COMBUSTION ENGINES.

1,373,860.   Specification of Letters Patent.   Patented Apr. 5, 1921.

Application filed May 13, 1916. Serial No. 97,252.

*To all whom it may concern:*

Be it known that I, HARRISON H. BOYCE, a citizen of the United States, residing in Forest Hills, county of Queens, and State of New York, have invented certain new and useful Improvements in Temperature-Indicating Devices for Internal-Combustion Engines, of which the following is a specification.

This invention relates to means for indicating the thermal condition of internal combustion engines and particularly to means adapted to indicate the temperature of the cooling water of water-cooled internal combustion engines as said water comes from the cylinder jackets.

In my Patent No. 1,090,776, I have pointed out the desirability of knowing at all times the thermal condition of an internal combustion engine and I have disclosed highly satisfactory means for giving an indication of such condition, such means comprising the use of a temperature indicating instrument arranged to be influenced by the temperature of the air space over the water in the cooling system of an engine. As pointed out in that patent, the taking of the temperature of an air space over the water in the cooling system has certain important advantages and peculiarities of operation, which I made use of in that invention and which have made that invention in the highest degree successful in general use.

In certain cases, however, it may be desirable to obtain an indication of the actual temperature of the water in the cooling system and this it is the object of my present invention to secure. The obtaining of actual water temperature, however, presents certain difficulties due to the uncertainty of conditions within the cooling system, and which my present invention overcomes. Thus for example, it will be seen that in an automobile where a water-cooled internal combustion engine is employed and a radiator is utilized, the water is circulated from the cylinder jackets through a pipe to the radiator and after passing through the radiator and being cooled circulates back through another pipe to the cylinder jackets. The amount of water in the system, however, is not constant due to evaporation, leakage, etc., and therefore, the temperature of the water in the radiator cannot be truly ascertained by merely inserting a thermometer into the upper part thereof as this thermometer while it may at times project into the water, will not be submerged therein if the water falls below a certain point; thus an irregular and unreliable reading of the instrument will result.

Another point to be considered is that the temperature of the water within the radiator is not uniform throughout. In some parts of the radiator after a substantial cooling has taken place, the temperature of the water will bear little relation to the temperature in the cylinder jackets. Therefore, in order to secure any accurate indication of engine temperatures, it is necessary to secure an indication of the temperature of the water as soon after it comes from the cylinder jackets as is possible.

The nature and more specific objects of my invention will appear from the following description of certain specific embodiments thereof taken in connection with the accompanying drawings, which illustrate such preferred embodiments. In these drawings, Figure 1 is a view of a radiator filler spout and fragment of the radiator of an automobile, this view being taken from the direction of the driver's seat. Fig. 2 is a vertical longitudinal sectional view of the upper part of the radiator, filler spout and cap, and return pipe of the radiator taken on line II—II of Fig. 1, showing an indicating instrument arranged within the filler spout and having the temperature responsive element thereof so located as to be influenced by the stream of water entering the radiator through the return pipe. Fig. 3 is a fragmentary view similar to Fig. 2 illustrating a modified construction. Fig. 4 is a sectional plan view through the upper part of a radiator provided with two return pipes showing how my invention may be applied to such a construction.

Referring to the drawings in detail, the numeral 1 designates the radiator of an automobile, which is shown as provided with the filler spout 2, which is closed by the cap 3. The heated water from the engine cylinder jackets is returned to the radiator through the return pipe 4, it entering the chamber 5 in the upper part of the radiator above the tubes 6 through the opening 7. The parts so far named may be of any well-known or suitable construction.

Mounted in the upper part of the radiator is a suitable temperature indicating instrument, which may be of any desirable construction, but which is shown as comprising a glass tube thermometer having a stem 8 and a bulb 9. This thermometer may be supported in any suitable manner and in any desired position but is shown as mounted within the filler spout and visible through a window 10 in the rear wall of the latter, in a manner similar to that set forth in my application, Serial No. 87,423 filed March 29th, 1916. The bulb of the thermometer projects into the space or chamber 5 at the top of the radiator and is protected by a suitable housing 11. The stem of the thermometer is shown as received within a casing 12, preferably formed integral with the wall of the filler spout, this casing having a screw-threaded nipple 13 projecting from the lower end thereof upon which the housing 11 is screwed.

If the radiator is completely filled, it will be seen that the bulb of the thermometer will be submerged in the water therein and will, therefore, indicate true water temperature. Experience has shown, however, that radiators cannot be ordinarily kept completely full for the reason that the water escapes by evaporation or leakage or by splashing through the usual vent pipe or overflow through the same when expanded by the rising temperature, so that under all ordinary conditions, the level of the water in the radiator is substantially below the top thereof and may be considered as generally somewhere in the region indicated by the dotted line 14 in Fig. 2. Of course, the water level may at times be higher than this, but is very often lower and may be below the top of the tubes 6. If the water level is as low as or lower than the line indicated by the numeral 14, it will be seen that the thermometer bulb is not actually submerged in the water in the radiator. However, as I wish to obtain the actual water temperature, I must have the water act directly upon the thermometer bulb. I accordingly locate the thermometer bulb in such relation to the opening 7 of the return pipe into the radiator as to place such bulb in the path of the stream of the returning water indicated by the numeral 15. This stream pouring over the thermometer bulb will cause the latter to indicate the temperature of the returning water and this will be true regardless of the level of the water in the radiator. Thus an indication of actual water temperature is given at all times regardless of the water level conditions and the temperature indicated is moreover the temperature of the hottest part of the water which is coming directly from the cylinder jackets and has not yet been cooled within the radiator. The position of the thermometer bulb or other temperature responsive element adjacent to the opening 7 should be governed so as to insure the flowing of the stream of returning water in contact with the bulb. The flow of this stream will vary depending upon the rapidity of circulation, the water in some cases where efficient pump circulation is utilized being projected from the return pipe with considerable force; while, in other cases, as for example, where a thermo-siphon circulation is employed, the water will flow gently into the radiator. The location of the temperature responsive element, therefore, may be modified more or less as conditions may require, but it is preferably located as near to the return pipe orifice as is convenient.

In Fig. 3, I have illustrated a modified form of the invention in which a basin 20 is formed adjacent to the return pipe orifice and which is arranged to be kept continually filled with hot water entering the radiator through the return pipe. The thermometer bulb 9 is arranged to dip into the water in the basin. Other constructions which will insure the submergence of the thermometer bulb at all times may be employed and will suggest themselves as conditions may require.

In Fig. 4, I have shown a construction in which the radiator 1 is provided with two return pipes 4, this being a construction which is sometimes employed with the V-type motors now in quite common use. The heated water from the jackets of one set of cylinders returns through one of the pipes; while, the water from the other set of the cylinders returns through the other pipe. In order to secure an indication of the water temperature by the use of a single instrument and which instrument is preferably located at the center of the radiator adjacent to the filler spout, I employ a manifold 25, which preferably consists of a pipe connected at each end with the two return pipes 4 and having at its center an open basin 26 into which the thermometer bulb 9 dips. The water entering the two pipes 4 passes through the two arms of the manifold and is discharged through the center opening 26 adjacent to the thermometer bulb.

While I have illustrated and described certain preferable embodiments of my invention, I do not wish to be understood as limiting myself thereto, but realize that changes may be made therein and intend to cover the principle of my invention broadly in whatever form it may be embodied.

Having thus described my invention, I claim:

1. In means for indicating the thermal condition of an internal combustion engine, having a water circulating cooling system including a radiator having a top tank and a return pipe for returning the heated water from the engine to the radiator, the return pipe discharging the heated water directly into the radiator in an unconfined stream through an orifice in the rear wall of said top tank, the combination with such radiator and return pipe, of a temperature indicating instrument having a temperature responsive element located in such proximity to such orifice as to be acted upon by the unconfined jet or stream of water entering the top tank through such orifice.

2. In means for indicating the thermal condition of an internal combustion vehicle propelling engine, said engine having a water cooling system including a radiator having a return pipe discharging directly into the radiator through an orifice in the back of the radiator and near the top thereof, said radiator having a filler spout in the top thereof, the combination with such radiator and filler spout of a thermometer mounted adjacent to the rear wall of the filler spout and having a temperature responsive element projecting into the upper part of the radiator and adjacent to the return pipe orifice where said element will be subjected to the stream of water entering the radiator through said orifice, the location of the indicating part of the thermometer with respect to the filler spout and the construction of the parts being such as to permit indications given by the thermometer to be observed from the return pipe side of the radiator.

3. In means for indicating the thermal condition of the internal combustion engine of a vehicle, said engine having a water circulation cooling system including a radiator having a return pipe and a filler spout, the combination with such radiator and filler spout of a thermometer attached to the rear wall of said filler spout in such manner and location and with such construction of the parts that the indicating part of the thermometer is visible from the return pipe side of the radiator, said thermometer having a temperature responsive element projecting into the upper part of said radiator in front of and adjacent to the return pipe orifice of said radiator where said element will be subjected to the stream of water entering the radiator through said orifice.

4. In means for indicating the thermal condition of an internal combustion vehicle propelling engine, said engine having a water cooling system including a radiator having a return pipe discharging into the radiator through an orifice in the back thereof near the top of the radiator, said radiator having a filler spout in the top thereof, the combination with the radiator and filler spout of a thermometer mounted inside of the filler spout adjacent to the rear wall thereof and having a bulb projecting into the upper part of said radiator in front of and adjacent to the return pipe orifice of said radiator where said bulb will be subjected to the stream of water entering through said orifice, said filler spout having a window in its rear wall through which the indicating part of said thermometer may be observed.

HARRISON H. BOYCE.